May 20, 1958 C. J. GREEN 2,835,082
AUTOMATED PISTON GRINDING MACHINE
Filed Aug. 9, 1955 6 Sheets-Sheet 1

Fig.1

INVENTOR
CLARENCE J. GREEN
BY
Harold W. Eaton
ATTORNEY

May 20, 1958      C. J. GREEN      2,835,082

AUTOMATED PISTON GRINDING MACHINE

Filed Aug. 9, 1955      6 Sheets-Sheet 2

INVENTOR
CLARENCE J. GREEN
BY Harold W. Eaton
ATTORNEY

C. J. GREEN 2,835,082

AUTOMATED PISTON GRINDING MACHINE

Filed Aug. 9, 1955

INVENTOR
CLARENCE J. GREEN
BY
Harold W. Eaton
ATTORNEY

May 20, 1958

C. J. GREEN 2,835,082

AUTOMATED PISTON GRINDING MACHINE

Filed Aug. 9, 1955

INVENTOR
CLARENCE J. GREEN
BY
Harold W. Eaton
ATTORNEY

United States Patent Office 2,835,082
Patented May 20, 1958

2,835,082
AUTOMATED PISTON GRINDING MACHINE

Clarence J. Green, Worcester, Mass., assignor to Norton Company, Worcester, Mass., a corporation of Massachusetts Application August 9, 1956, Serial No. 603,079

15 Claims. (Cl. 51—105)

This invention relates to grinding machines, and more particularly to an automated piston grinding machine.

One object of the invention is to provide a simple and thoroughly practical practical automated piston grinding machine. Another object is to provide an automatically actuated loading and discharging mechanism for conveying pistons to be ground to and from a plurality of grinding units before and after a grinding operation. Another object is to provide a longitudinally extending conveyor to supply pistons to be ground to a plurality of transversely arranged loading units, one for each unloading station. Another object is to provide means to orient successive pistons as they pass from the conveyor onto the loading units.

A further object is to provide a pivotally mounted loading arm automatically to transfer successive pistons from the loading unit into axial alignment with the work supporting and rotating heads. Another object is to provide a pivotally mounted unloading arm automatically to transfer successive ground pistons from said heads onto a transversely arranged unloading unit automatically to discharge successive ground pistons onto an unloading conveyor.

Another object is to provide an intermittently actuated indexing mechanism for indexing each of said loading units to position successive pistons into operative position relative to said loading arms. Another object of the invention is to provide a pair of adjacent oppositely driven loading conveyors combined with a deflector adjacent to each end thereof to transfer successive pistons to be ground from one conveyor to the other so as to provide a continuous circulation of pistons to be ground. Other objects will be in part obvious or in part pointed out hereinafter.

In the accompanying drawings in which is shown one of various possible embodiments of the mechanical features of this invention.

Figure 1:
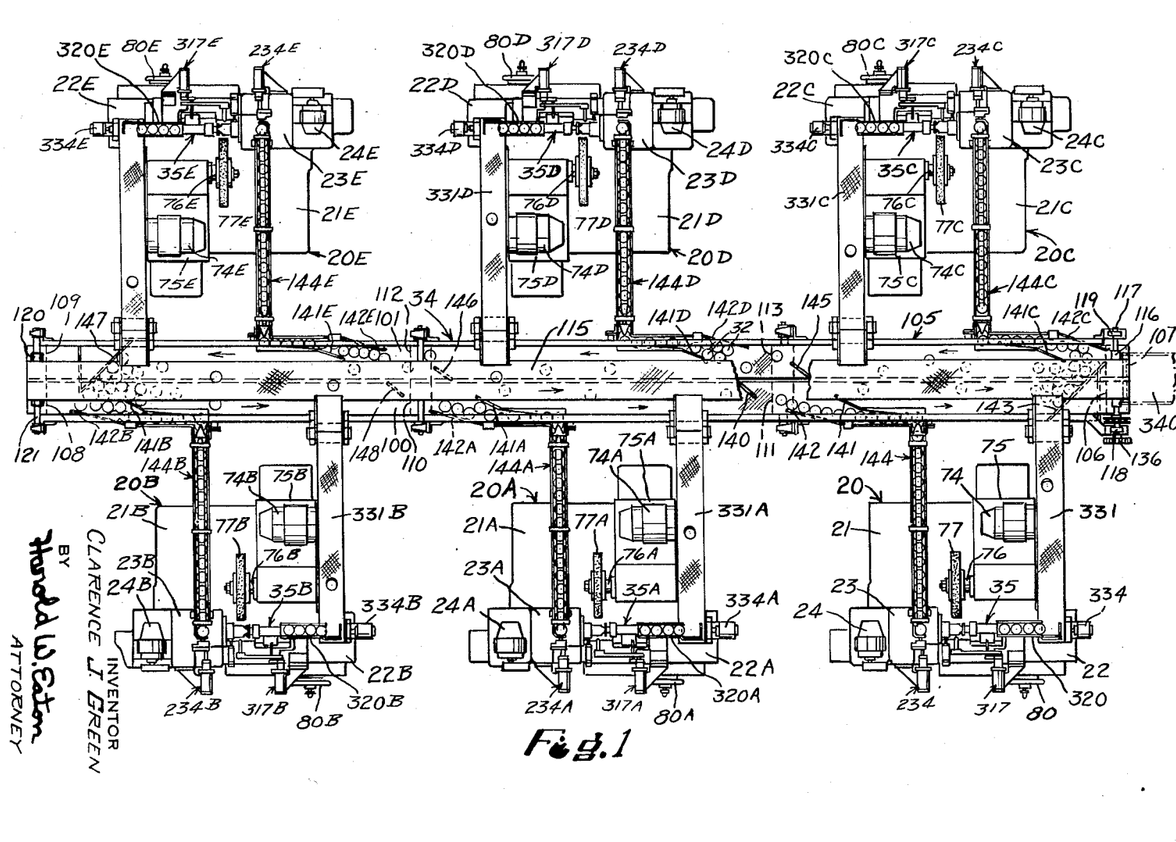
Figure 1 is a plan view of an automated piston grinding machine showing a plurality of grinding units together with a work handling apparatus.

An automated piston grinding apparatus has been illustrated in Figure 1 comprising a plurality of grinding units 20, 20A, 20B, 20C, 20D, and 20E all of which are identical in construction and are arranged back to back. A conveyor mechanism 34 is provided for supplying successive pistons simultaneously to the grinding units. This conveyor apparatus will be hereinafter more fully described.

All of the piston grinding units 20, 20A, 20B, 20C, 20D and 20E are identical in construction consequently only piston grinding unit 20 will be described in detail. Corresponding reference numerals suffixed by the letters A, B, C, D, and E referred to identical parts of the grinding units.

The piston grinding unit 20 comprises a base 21 (Figures 1 and 2) which supports a work table 22. The work table 22 supports a work head 23 having a driving motor 24 for imparting a rotary motion to the work piece being ground. The table 22 also supports a rock bar 25 having a rotatable work spindle 26 (in Figure 4) for supporting and driving the left hand end of a work piece during a grinding operation. The rock bar 25 is arranged so that it may be oscillated during a grinding operation by means of a master cam and a follower roller (not shown) which may be substantially the same as that shown in my prior U. S. Patent No. 2,599,987 dated June 10, 1952 to which reference may be had for details for disclosure not contained herein.

The work spindle 26 is provided with a work driver 27 (Figure 4) which is provided with a plurality of symmetrically arranged pivotally mounted grip fingers 28. The grip fingers 28 are pivotally supported by studs 29 on the work driver 27. Compression springs 30 serve normally to maintain the grip fingers 28 in an inoperative position. When a piston 32 to be ground is moved axially toward the work driver 27, the end face of the piston 32 engages a plurality of symmetrically arranged spring-pressed plungers 31 and 31a. The plungers 31 are arranged when moved toward the left (Figure 4) to swing the work gripping fingers 28 into an operative driving engagement with the periphery of the piston to be ground.

The rock bar 25 also supports a footstock 35 which is provided with a slidably mounted spindle 36 having a work center 37 mounted in the left hand end thereof. The work center 37 supports an anti-friction bearing 38 which in turn supports a frusto-conical work center 39. The frusto-conical work center 39 is moved axially into supporting engagement with the open end of the piston 32 to be ground.

A fluid pressure mechanism is provided for actuating the footstock spindle 36. This mechanism comprises a cylinder 40 (Fig. 4) which contains a slidable piston 41. The piston 41 is connected to the right hand end of a piston rod 42. The left hand end of the piston rod 42 is provided with a screw threaded portion 43 which is threaded into a central aperture formed within a sleeve 44. The sleeve 44 is slidably mounted within a central aperture 45 formed within spindle 36. A compression spring 46 is provided within the aperture 45. The spring is interposed between the left hand end of the sleeve body 44 and the left hand end of the aperture 45. When fluid under pressure is passed through a pipe 47 into a cylinder chamber 48 the piston 41 together with the sleeve 44 is moved toward the left to move the work center 39 into operative supporting engagement with the open end of the piston 32 to be ground. Continued movement of the piston 41 compresses the spring 46 and moves the piston 32 to be ground in an axial direction toward the left into engagement with the work driver 27. The piston 32 moves the plungers 31 toward the left causing the grip fingers 28 to move into driving engagement with the periphery surface of the piston 32. While the piston 32 to be ground is thus supported, the work center 39 is maintained in yielding engagement with the open end of the piston 32 by the compression of the spring 46.

Figures 4, 5:
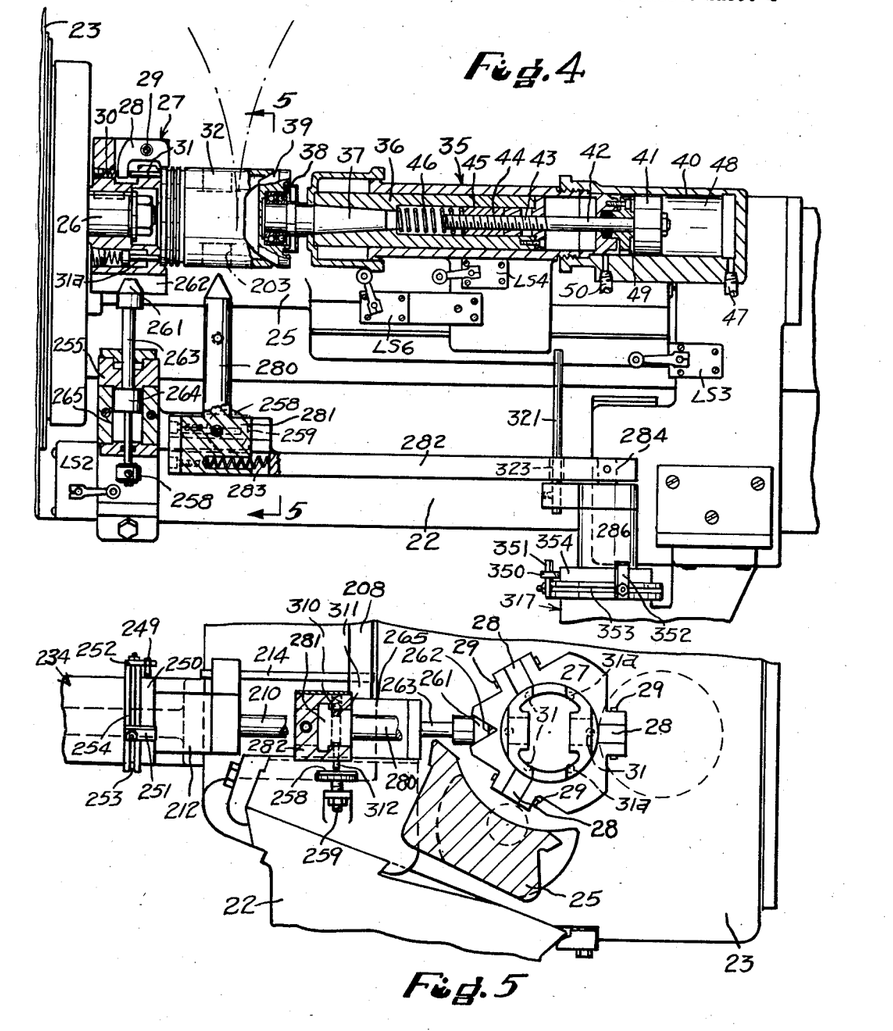
Figure 4 is a fragmentary plan view, on an enlarged scale, of the work supporting and rotating mechanism, and the work loading mechanism therefor, partly broken away and shown in section.
Figure 5 is a fragmentary cross sectional view, taken approximately along the line 5—5 of Figure 4.

During movement of the piston 41 toward the left, fluid within a cylinder chamber 49 is exhausted through a pipe 50. When the flow of fluid under pressure is reversed and passes through pipe 50 into the cylinder chamber 49 the piston 41 moves toward the right thereby releasing the compression of the spring 46 and moves the sleeve 44 toward the right until it engages the right hand end of the aperture 45 after which continued movement of the piston 41 moves the footstock spindle 46 toward the right to withdraw the footstock center 39 from supporting engagement with the piston 32.

Figure 16:
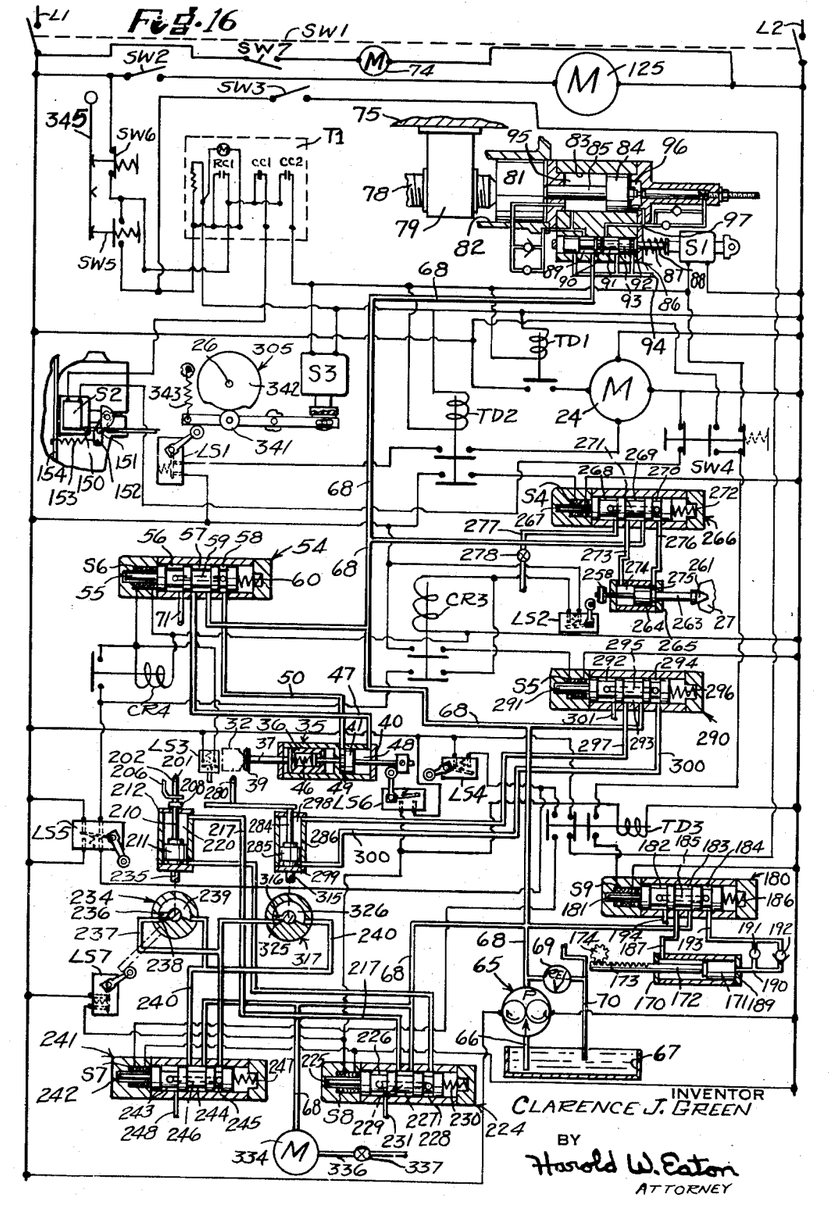
Figure 16 is a combined electric hydraulic diagram of the various actuating mechanisms and the controls therefor.

A solenoid actuated valve 54 (Fig. 16) is provided for controlling the admission to and exhaust of fluid from the cylinder 40. The valve 54 is a piston type valve comprising a slidable valve member 55 having a plurality of spaced valve pistons formed integrally therewith to form spaced valve chambers 56, 57, and 58. The valve member 55 is provided with a central passage 59 which connects the valve chamber 56 with the valve chamber 58. A compression spring 60 serves normally to hold the valve member 55 in a left hand end position, as shown in Fig. 16. A solenoid S6 is operatively connected to the valve member 55 which when energized serves to shift the valve member 55 toward the right to reverse the flow of fluid to and the exhaust of fluid from cylinder 40.

A fluid pressure system is provided for supplying fluid under pressure to various actuating mechanisms of the machines. This system comprises a motor driven fluid pump 65 which draws the fluid through pipe 66 from a reservoir 67 and forces fluid under pressure through a pipe 68. A relief valve 69 is connected in the pipe 68 to facilitate exhausting access of fluid under pressure through a pipe 70 into the reservoir 67 so as to maintain a substantially constant operating pressure through a fluid pressure system.

In the position of the valve 54 (Fig. 16) fluid under pressure in the pipe 68 passes into the valve chamber 57 and through the pipe 47 into the cylinder chamber 48 to move the piston 41 toward the left into the position illustrated in Figs. 4 and 16. During this movement fluid exhausting from the cylinder chamber 49 and the pipe 50 enters the valve chamber 58 and passes through the central passage 59 into the valve chamber 56 and exhausts through a pipe 71 into the reservoir 67. When the solenoid S6 is energized, the valve member 55 is shifted into a right hand end position so that fluid from the pipe 68 enters the valve chamber 57 passes through the pipe 50 into a cylinder chamber 49 to move the piston 41 together with the footstock spindle 36 and the footstock center 39 toward the right in an inoperative position.

Figure 2:
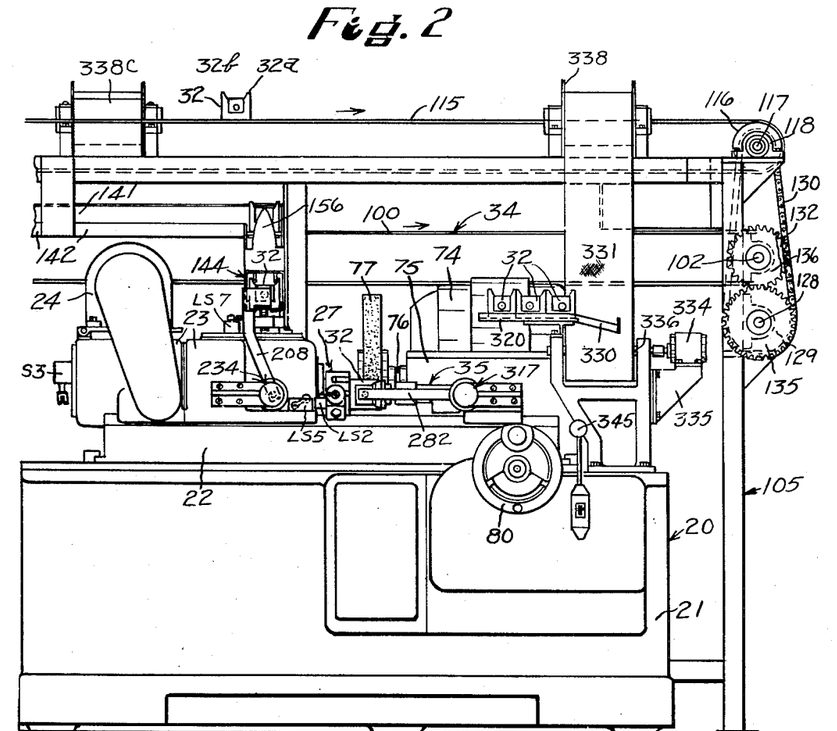
Figure 2 is a front elevation of one of the piston grinding units with the work handling and loading mechanism therefor.
Figure 3:
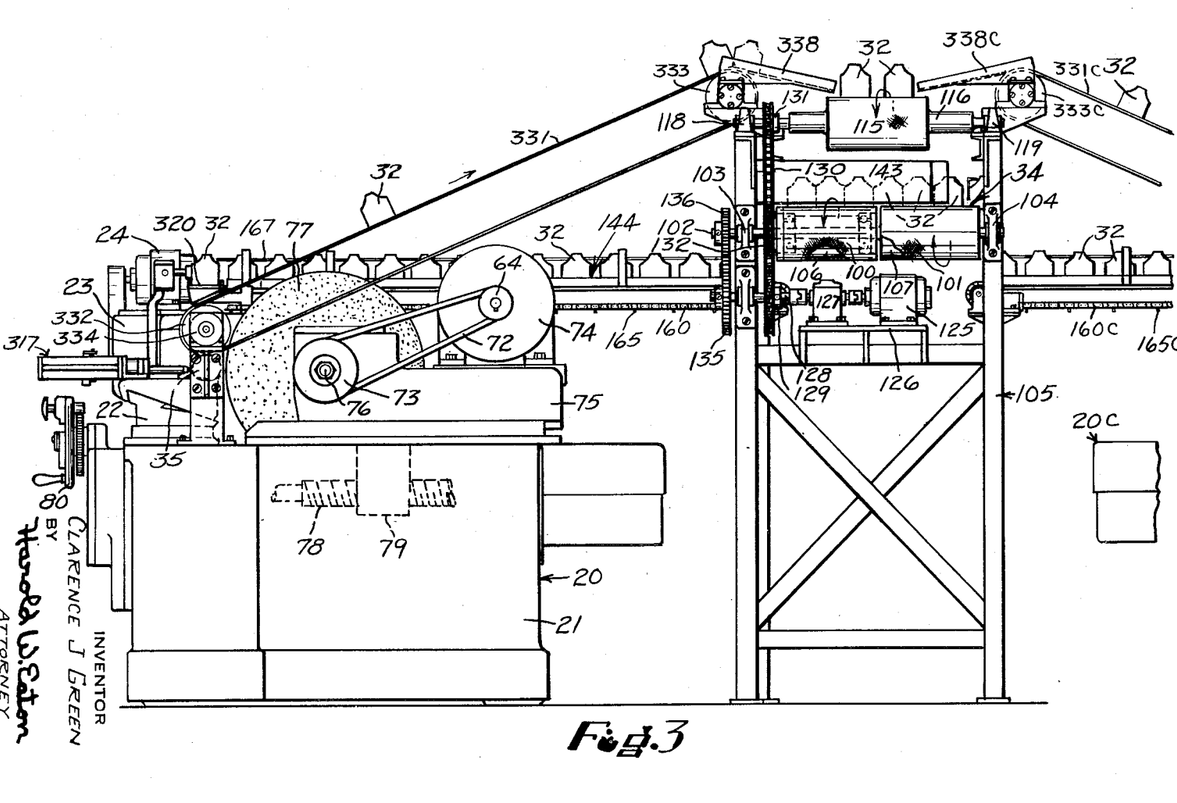
Figure 3 is a right hand end elevation of the grinding unit and the work handling mechanism shown in Figure 2.

A tranversely movable wheel slide 75 is mounted on the base 21 of each of the grinder units 20. The wheel slide 75 is arranged to slide transversely relative to the base 21 on the usual well known V-way and flat way (not shown) formed on the upper surface of the base 21. The wheel slide 75 is provided with a rotatable wheel spindle 76 journaled in suitable bearings (not shown). The spindle 76 supports a grinding wheel 77 at its left hand end (Fig. 2). A suitable driving mechanism is provided for the wheel spindle 76 and the grinding wheel 77 comprising a motor 74 supported on the upper surface of the wheel slide 75. The motor 74 is provided with a V-groove pulley 64 which is connected by multiple V-belts 72 with a multiple V-groove pulley 73 mounted on the other end of the wheel spindle 76 (Fig. 3).

A feeding mechanism is provided for imparting a transverse feeding movement to the wheel slide 75 comprising a rotatable feed screw 78 which meshes with a feed nut 79, depending from the under side of the wheel slide 75. A manually operable feed wheel 80 is rotatably supported on the front of the wheel base 21 (Figs. 2 and 3) and is operatively connected to impart a rotary movement to the feed screw 78. This feeding mechanism may be identical with that disclosed in the prior U. S. patent to H. L. Swainey No. 2,582,610 dated January 15, 1952, to which reference may be had for details for disclosures not contained herein.

A hydraulic operated mechanism is provided for imparting a rapid transverse movement to the wheel slide 75 and the grinding wheel 77. As illustrated in Fig. 16, the right hand end of the feed screw 78 is operatively connected to a slidably mounted sleeve 81 which is slidably supported within a cylindrical aperture 82 formed within the base 21 (Fig. 16). A cylinder 83 is positioned in axial alignment with the feed screw 78 and the sleeve 81. The cylinder 83 contains a slidably mounted piston 84 which is fixedly mounted on the right hand end of a piston rod 85. The left hand end of the piston rod 85 is operatively connected to the sleeve 81 so that when the piston 84 is moved in either direction a rapid axial movement will be imparted to the feed screw 78 to cause a rapid approaching or receding movement of the feed wheel slide 75 and the grinding wheel 77.

A control valve 86 is provided for controlling the admission to and exhaust of fluid from the cylinder 83. The control valve 86 is a piston type valve having a slidably mounted valve member 87 which is provided with a plurality of spaced integral valve pistons arranged to form a plurality of spaced valve chambers 89, 90, 91 and 92. The valve member 87 is provided with a central passage 93 which interconnects the valve chamber 90 with the valve chamber 92. A compression spring 88 is provided which serves normally to maintain the valve member 87 in a right hand end position. A solenoid S1 is provided which when energized serves to shift the valve member 87 into a left hand end position. In the position of the valve 86 (Fig. 16) fluid under pressure in the pipe 68 enters the valve chamber 89 and passes into a cylinder chamber 95 to move the piston 84 together with the feed screw 78, the wheel slide 75 and the grinding wheel 77 toward the right (Fig. 16) into a rearward or inoperative position. During this movement of the piston 84 fluid within a valve chamber 96 may exhaust through a passage 97 into the valve chamber 91 and exhaust through a pipe 94 into the reservoir 67.

The grinding units 20A, 20B, 20C, 20D, and 20E are identical with the grinding unit 20 just described and consequently will not be described in detail. The same reference numerals have been used on Fig. 1 of the drawing for each of these grinder units, the numerals being suffixed with the letters A, B, C, D and E.

A conveyor apparatus is provided for simultaneously supplying pistons to be ground to all of the grinder units. The conveyor apparatus also serves to convey ground pistons from all of the grinding units to the discharge end of the machine. The loading conveyor apparatus comprises a pair of conveyor belts 100 and 101 which are arranged to travel in opposite directions. The right hand end of the conveyor belts 100 and 101 are supported by a pair of pulleys or drums which are supported by a shaft 102 which is journaled in a pair of spaced bearings 103 and 104 carried by a frame 105. The pulley 106 supporting the right hand end of the conveyor belt 100 is supported by antifriction bearings on the shaft 102. A pulley or drum 107 which supports the right hand end of the conveyor belt 101 is fixedly mounted on the shaft 102.

The left hand ends of the conveyor belt 100 and 101 are supported by idler pulleys of drums 108 and 109. These idler pulleys of drums are supported by a shaft (not shown) carried by a frame at the left hand end of the machine. The conveyor belt 100 may be supported at spaced intervals by means of idler pulleys or drums 110 and 111. The conveyor belt 101 may be supported by spaced idler pulleys or drums 112 and 113. Only two sets of idlers have been illustrated in Figure 1. If desired or necessary an additional idler or pulleys may be provided to adequately support the conveyor belts 100 and 101.

A conveyor belt 115 is provided for conveying ground pistons from all of the grinder units to the discharge end of the machine. The conveyor belt 115 is located above the conveyor belts 100 and 101 and is supported at its right hand end by means of a drum 116. The drum 116 is fixedly mounted on a drive shaft 117. The drive shaft 117 is supported in journaled bearings 118 and 119 which are carried by the frame 105. A drum 120 supported on a shaft 121 (Fig. 1) serves as a support for the left hand end of the conveyor belt 115.

A driving mechanism is provided for the conveyor belts 100, 101 and 115 comprising an electric motor 125 which is supported on a bracket 126 (Fig. 3) carried by a frame 105. The motor 125 drives a speed reducer unit 127 which may be any of the well known commercial varieties. The driven shaft of the speed reducing unit 127 is connected to rotate a shaft 128 which supports a sprocket 129. The sprocket 129 is connected by a link chain 130 with a sprocket 131 mounted on the shaft 117 to facilitate driving the active side of the conveyor belt 115 in the direction of the arrow (Figs. 1 and 2), that is, toward the right. A sprocket 132 is fixedly mounted to the drum or pulley 106 and meshes with the link chain 130 so as to cause the active run of the conveyor belt 100 to travel in the direction of the arrow (Figs. 1 and 2), that is, toward the right. The shaft 128 supports a gear 135 which meshes with a gear 136 fixedly mounted on the left hand end of the shaft 102 so as to impart a rotary motion to the drum or pulley 107 to drive the active portion of the conveyor belt 101 in the direction of the arrows (Figs. 1 and 3), that is, toward the left.

A plurality of pistons 32 to be ground may be placed upon either the conveyor belt 100 or the conveyor belt 101. The conveyor belt 100 is traveling in a direction toward the right and conveyor belt 101 toward the left (Fig. 1). As the pistons 32 to be ground approach grinding unit 20, a deflector plate 140 serves to shift the pistons to the lower edge of the conveyor belt 100 (Fig. 1) into the path of a deflector plate 141 which guides a plurality of pistons 32 toward a loading conveyor 144, to be hereinafter described, for conveying pistons 32 to the grinding unit 20. A guide plate 142 serves in cooperation with the deflector plate 141 to guide the pistons to loading mechanism. After a plurality of pistons to be ground have been accumulated between the space of the deflector plate 141 and the guide plate 142, the conveyor belt 100 conveys the excess pistons to be ground toward the right. As the pistons traveling on the conveyor belt 100 approach right hand end of the conveyor belt 100 they move into engagement with a deflector plate 143 which shifts the pistons from belt 100 onto the conveyor belt 101 which is traveling in a direction toward the left (Fig. 1). Some of the pistons which are transferred onto conveyor belt 101 are picked up by a deflector plate 141C and guided by a guide plate 142C to a loading conveyor 144C to be hereinafter described.

When the space between the deflector plate 141C and the guide plate 142C has been filled with unground pistons, the conveyor belt 101 carries the excess pistons to be ground toward the left. As the unground pistons approach grinding unit 20D, a deflector plate 145 serves to shift the pistons carried by the conveyor belt 101 toward the upper edge of the belt 101, as shown in Fig. 1 to fill the space between a deflector plate 141D and a guide plate 142D. The deflector plate 141D and guide plate 142D guide the piston 32 to a loading conveyor 144D.

When the space between the deflector plate 141D and guide plate 142D has been filled with unground pistons, the excess pistons are carried by the conveyor belt 101 toward the left until they are deflected by deflector plate 146 to guide the unground pistons between a deflector plate 141E and a guide plate 142E to a loading conveyor 144E. When the space between the deflector plate 141E and the guide plate 142E has been filled with unground pistons, excess pistons to be ground are carried by the conveyor belt 101 toward the left. As the pistons approach the left hand end of the conveyor belt 101, a deflector plate 147 serves to shift the pistons 32 to be ground from the conveyor belt 101 onto the conveyor belt 100 so that they start traveling toward the right. As the pistons move onto the belt 100, some of the pistons 32 are picked up by a deflector plate 141B and guide by a plate 142B to a loading conveyor 144B.

When the space between the deflector plate 141B and the guide plate 142B has been filled with pistons to be ground, the excess pistons are carried by the belt 100 toward the right until they move into engagement with deflector plate 148 which shifts the pistons to be ground toward the lower edge of the belt 100 (Fig. 1) so that they are conveyed into the space between the deflector plate 141A and guide plate 142A. The deflector plate 141A and guide plate 142A serve to guide the pistons in a manner hereinafter described to a loading conveyor 144A, to be hereinafter described, to convey the successive pistons to the grinder unit 20A.

When the space between the deflector plate 141A and the guide plate 142A has been filled with unground pistons, the excess pistons to be ground are carried toward the right by the belt 100 until they engage deflector plate 140 which shifts the pistons so that they are carried between deflector plate 141 into the space between the deflector plate 141 and the guide plate 142 to a loading conveyor 144, to be hereinafter described which conveys successive pistons to be ground to the grinder unit 20.

It will be readily apparent from the foregoing disclosure that pistons to be ground may be placed upon either the conveyor belt 100 or the conveyor belt 101 and they travel first toward the right if upon the conveyor belt 100 and toward the left if they are on the conveyor belt 101 until they are picked up by deflector plates above described to be conveyed to one of the loading conveyors at each grinder unit. The excess pistons on the belts continue their travel with the belts either toward the right or toward the left until they are picked off the conveyor belts and deflected toward one of the grinder units.

Figures 13, 14, 15:
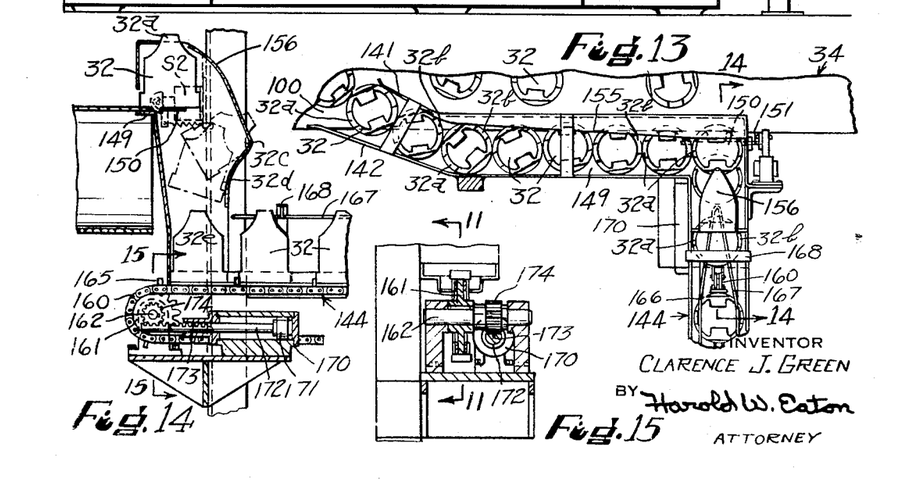
Figure 13 is a fragmentary plan view, on an enlarged scale, of a portion of the work positioning and transferring mechanism for transferring successive work pieces from the main conveyor to a transverse loading chute.
Figure 14 is a fragmentary vertical sectional view taken approximately along the line 14—14 of Figure 13.
Figure 15 is a fragmentary vertical sectional view, on an enlarged scale, taken approximately along the line 15—15 of Figure 14.

The pistons 32 to be ground are provided with upwardly projecting portions or lugs 32a and 32b. The pistons 32 are positioned on the conveyor belts 100 and 101 in an inverted position, that is, with the lugs 32a and 32b projecting upwardly. As shown in Fig. 13, pistons 32 engaging the deflector plate 141 are moved by the thrust of the conveyor belt 100 in the channel formed between the deflecting plates 141 and the guide plate 142. A plate 149 arranged in alignment with the upper surface of the conveyor belt 100 serves to support the pistons 32 as they leave the conveyor belt 100. The deflector plate 141 is provided with a guiding surface 155 which is arranged to engage one of the lugs, either 32a or 32b of the pistons 32 as they move along the guiding plate 42 to turn or orient the pistons so that when they reach the right hand end position as shown in Figure 13, the lugs 32a and 32b are arranged in a substantially horizontal position. In the right hand end position, the piston 32 (Fig. 13) is supported by a pivotally mounted trap door 150. The trap door 150 is pivotally supported on a rock shaft 151. The rock shaft 151 is provided with the downwardly projecting lug 152 (Fig. 16). A tension spring 153 is connected between the lug 152 and a plate 154 of the housing (Fig. 16). An electric solenoid S2 is arranged when energized to rock the trap door 150 in a clockwise direction (Fig. 14) so that the piston 32 is allowed to slide through position 32c and 32d into position 32e on a loading conveyor chain 160. In order to retain the piston in a predetermined position as it drops from the plate 49 and the trap door 150 onto the loading conveyor chain 160, the lugs 32a and 32b swing into engagement with the opposite side faces of a cam 156. As the piston drops into the position 32c the lugs 32a and 32b slide down the opposite faces of the cam plate 156 (Figs. 13 and 14) which serves to maintain the pistons in the desired orient position and to deposit it in this position on the loading conveyor chain 160.

Figures 6, 7, 9, 10, 11:
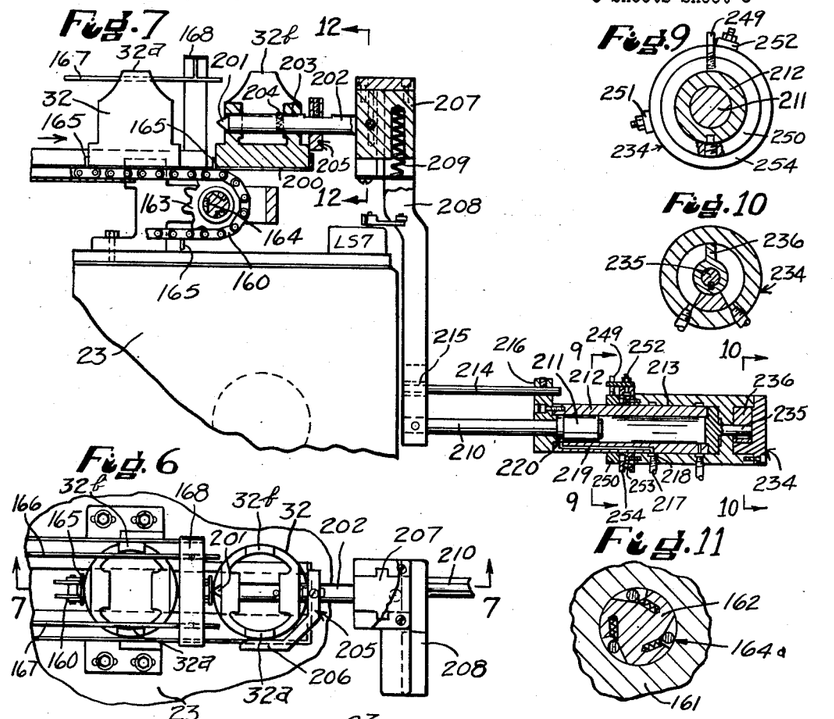
Figure 6 is a fragmentary plan view, on an enlarged scale, of a portion of one of the work conveyors as shown in Figure 1.
Figure 7 is a fragmentary vertical sectional view, taken approximately along the line 7—7 of Figure 6.
Figure 9 is a vertical sectional view, on an enlarged scale, taken approximately on the line 9—9 of Figure 7.
Figure 10 is a vertical sectional view on an enlarged scale taken approximately on the line 10—10 of Figure 7.
Figure 11 is a sectional view, on an enlarged scale, through a one-way overrunning clutch as shown in Figure 7, and also along line 11—11 of Figure 15.

The loading conveyor chain 160 is supported at one end by a sprocket 161 mounted on a rotatable shaft 162 (Fig. 14). The other end of the loading conveyor chain 160 is supported by a sprocket 163 which is in turn supported by a one-way ball clutch 164. The loading conveyor chain is provided with a plurality of spaced lugs 165 which are arranged to engage the pistons 32 to move the pistons toward the right (Figs. 7 and 14). A pair of spaced parallel guide rods 166 and 167 are supported by a plurality of spaced brackets 168. These guide rods are positioned to engage the inner faces upwardly extending lugs 32a and 32b on the pistons 32 to precisely position or orient the pistons as they are moved along by the loading conveyor chain 160. As shown in Fig. 13, the upper ends of guide rods 166 and 167 are joined together to form a V-shaped portion which serves to facilitate orienting the pistons 32. The upwardly projecting lugs 32a and 32b of the piston 32 move downwardly (Fig. 13) when the link chain 160 is indexed and engage one or the other of the side faces of the V-shaped portion of the guide rods to facilitate orienting the pistons 32 before the lugs 32a and 32b move into engagement with to parallel portions of the guide rods 166 and 167.

A driving mechanism is provided for intermittently indexing the loading conveyor chain 160. This mechanism comprises a fluid pressure cylinder 170 (Fig. 14) which contains a slidably mounted piston 171. The piston 171 is connected to the right hand end of a piston rod 172. The left hand end of the piston rod 172 is provided with rack teeth 173 which mesh with a gear 174 which is keyed onto the shaft 162. A one-way ball clutch 164a (Fig. 11) is interposed between the sprocket 161 and the shaft 162. The one-way clutch 164a is arranged so that when the piston 171 is moved toward the left, the rack bar 173 will move toward the left to impart a lockwise rotary motion to the gear 174 and through the one-way clutch to impart a clockwise rotary motion to the sprocket 161 to index the link chain 160 by a distance substantially equal to the spacing of the lugs 165 on the chain 160 so as to advance pistons to be ground successively to a loading position to be hereinafter described. The ball clutch 164 (Fig. 7) serves to allow the sprocket 163 to rotate in a clockwise direction only during an indexing movement of the chain 160 in a clockwise direction.

During the movement of the piston 171 toward the right, the ball clutch 164a between the sprocket 161 and the shaft 162 will allow the shaft 162 and the gear 174 to rotate idly during the idle movement of the piston 171.

A control valve 180 is provided for controlling the admission to and exhaust of fluid from the cylinder 170. The valve 180 is a piston type valve having a slidably mounted valve member 181 which is provided with spaced integral pistons to form a plurality of spaced valve chambers 182, 183, 184. The slidable valve member 181 is provided with a central passage 185 (Fig. 16) which interconnects the valve chamber 182 with the valve chamber 184. A compression spring 186 serves normally to hold the valve member 181 in a left hand end position as shown in Figure 16. An electric solenoid S9 is provided which when energized serves to shift the valve member 181 toward the right to reverse the flow of fluid to the cylinder 170.

In the position of the valve 180 (Fig. 16) fluid under pressure from the pressure pipe 68 enters the valve chamber 183 and passes through the pipe 187 into a cylinder chamber 188 formed to the left hand end of the cylinder 170 to move the piston 171 toward the right into the position illustrated in Figure 16. During this movement of the piston 171 fluid within a cylinder chamber 189 formed at the right hand end of the cylinder 170 exhaust through a pipe 190, through a throttle valve 191 through a ball check valve 192 through a pipe 193 into the valve chamber 184, through the central passage 185 into the valve chamber 182 and exhaust through an exhaust pipe 194 into the reservoir 67.

When it is desired to index the loading conveyor chain 160, the solenoid S9 is energized as will be hereinafter described to shift the valve member 181 into a right hand end position so as to pass fluid under pressure into the cylinder chamber 189 to impart an indexing movement to the loading conveyor chain 160. During this indexing movement, fluid cannot pass through the valve check 192 but must pass through the throttle valve 191 which controls the rate of the indexing movement of the link chain 160.

At each indexing movement of the loader conveyor chain 160, a piston 32 to be ground is moved onto the plate 200 (Fig. 7). As the piston 32 slides onto the plate 200 a wrist pin hole 203 in the piston 32 slides onto the conical end 201 of the spindle 202 until the piston 32 is positioned as illustrated in Fig. 7. A spring pressed ball detent 204 carried by the spindle 202 serves to frictionally hold the piston from endwise movement relative to spindle 202. The piston 32 moves into an engagement to the bracket 205. The bracket 205 is provided with an arm 206 extending at right angles relative to the bracket 205 (Fig. 6) and is provided with a surface which engages the periphery of the piston 32 to hold the piston 32 against any rotary movement relative to the spindle 202 during the loading operation.

The spindle 202 is fixedly mounted on a slide block 207 which is slidably supported adjacent to the upper end of the loading arm 208. A compression spring 209 serves normally to hold the slide block 207 in an uppermost motion as illustrated in Fig. 7. The slide block 207 is free to slide relative to the arm 208 as the footstock center 39 moves a piston 32, supported on the spindle 202, into engagement with the work driver 27.

The loading arm 208 is fixedly mounted on the left hand end of a piston rod 210 (Fig. 7). A piston 211 is mounted on the right hand end of the piston rod 210 and is slidably mounted with a rotatable cylinder 212. The cylinder 212 is provided with an outer cylindrical surface which mates with a cylindrical aperture 213 (Fig. 7). A guide rod 214 is fixedly mounted in an upwardly extending lug 216 formed on the left hand head of the cylinder 212. The slide rod 214 passes through a bushed hole 215 in the loading arm 208 to hold the arm 208 during movement of the piston 211.

When fluid under pressure is passed through a pipe 217, it enters an annular channel 218 formed within the aperture 213. Fluid under pressure entering the channel 218 passes through a passage 219 into a cylinder chamber 220 to move the piston 211 toward the right (Fig. 7) thereby facilitating withdrawing the spindle 202 from the piston after it has been loaded into the machine.

A control valve 224 is provided for controlling the admission to and exhaust of fluid from the cylinder 212. The valve 224 is a piston-type valve having a slidably mounted valve member 225 formed with a plurality of integral spaced valve pistons which form a plurality of spaced valve chambers 226, 227, and 228. The valve member 225 is also provided with a central passage 229 which interconnects the valve chamber 226 with the valve chamber 228. A compression spring 230 serves normally to hold the valve member 226 in a left hand end position. A solenoid S8 is provided which when energized serves to shift the valve member 225 into a right hand end position.

A rotary vane-type fluid motor 234 is provided for imparting clockwise swinging movement to the loading arm 208 (Fig. 2) to swing the piston 32 to be ground from the plate 200 into axial alignment with the work driver 27 and the foodstock center 39. A motor shaft 235 is fixedly mounted to the right hand end of the cylinder 212. A single motor vane 236 is keyed to the shaft 235. When fluid under pressure is passed through a pipe 237 into a motor chamber 238, the vane 236 is moved in a clockwise direction to swing the loading arm 208 also in a clockwise direction (Fig. 2) into an operative position. During this movement, fluid within the motor chamber 239 is exhausted through a pipe 240.

A control valve 241 is provided for controlling the admission to and exhaust of fluid from the motor 234. The valve 241 is a piston type valve having a slidably mounted valve member 242 formed with a plurality of integral spaced valve pistons which form a plurality of spaced valve chambers 243, 244, and 245. The valve member 242 is also provided with a central passage 246 which interconnects the valve chamber 243 with the valve chamber 245. A compression spring 247 serves normally to hold the valve member 242 in a left hand end position. A solenoid S7 is provided which when energized serves to shift the valve member 242 into a right hand end position.

In the position of the valve 241 (Fig. 16) fluid under pressure from the pipe 68 enters the valve chamber 244 and passes through the pipe 240 into the motor chamber 239 to maintain the motor vane 236 in the position illustrated in Fig. 16 so as to hold the loading arm 208 in a vertical position as illustrated in Figs. 2 and 7. As the vane 236 of the motor 234 moves in a counter clockwise direction into the position illustrated in Fig. 16, fluid within the motor chamber 238 may exhaust through the pipe 237 into the valve chamber 245, through the central passage 246 into the valve chamber 243 and exhaust through an exhaust pipe 248 into the reservoir 67. When the solenoid S7 is energized, the fluid under pressure to the vane type motor 234 is reversed so that the motor vane moves in a reverse direction.

The rotary motion of the motor vane 234 is limited by a stud 249 which is fixedly mounted on a collar 250. The collar 250 is fixedly mounted on the periphery of the cylinder 212. A pair or adjustable dogs 251 and 252 are supported by an annular T-slot 253 which is formed in the periphery of a collar 254 fixedly mounted on the casing of the motor 234. By manipulation of the dogs 251 and 252, the extent of swinging movement of the loading arm 208 may be adjusted as desired to facilitate swinging the work piece to be ground from the plate 200 into axial alignment with the work driver 27 and the footstock center 39. The vane motor 234 operates first to swing the loading arm 208 in a clockwise direction (Fig. 2) so as to transfer a piston 32 to be ground from the plate 200 into axial alignment with the work driver 27 and the footstock center 39. The piston 41 and the footstock spindle 36 then moves toward the left (Fig. 4) to move the footstock center 39 into an engagement with the open end of the piston 32 and to move the piston 32 in an axial direction into an engagement with the work driver 27. Movement of the piston 32 into the engagement of the work driver swings the work gripping fingers 28 into a driving engagement with the periphery with the piston to be ground.

The axial movement of the piston 32 shifts the spindle 202 together with the slide block 207 against the compression of the spring 209 to facilitate axial movement of the piston 32 to be ground into operative engagement with the work driver 27. The slide block 207 moves a sufficient distance relative to the arm 208 so that a spring pressed ball 255 engages a hole 256 in the slide block 207 so as to hold the slide block 207 to facilitate removal of the spindle 202 from the wrist pin hole 203 in the piston 32. In this position of the parts, fluid is passed into the end cylinder chamber (Fig. 7) to move the piston 211 toward the right thereby withdrawing the spindle 202. During withdrawal of the spindle 202, a plunger 257 moves into an engagement with the head 258 of a screw 259 which serves to raise the plunger 257 so as to push the ball 255 out of the engagement with the hole 256 thereby releasing the compression with the spring 209 which returns the slide block 207 into its initial position.

A frusto-conically-shaped plunger 261 (Figs. 4 and 5) is arranged to be moved into engagement with a V-shaped notch 262 formed in the work driver 27 to hold the driver 27 in a predetermined position during the unloading and loading operations. The plunger 261 is mounted on the upper end of the piston rod 263 (Fig. 4). The piston rod 263 is connected to a piston 264 which is slidably mounted within a cylinder 265. A control valve 266 is provided for controlling the admission to and exhaust of fluid from the cylinder 265. The valve 266 is a piston type valve having a slidably mounted valve member 267 which is formed with a plurality of spaced integral valve pistons forming spaced valve chambers 268, 269, and 270. The valve member 267 is provided with a central passage 271 which interconnects the valve chamber 268 with the valve chamber 270. The valve member 267 is normally held in a left hand end position by a compression spring 272 (Fig. 16). A solenoid S4 is provided which when energized serves to shift the valve member 268 toward the right to reverse the flow of fluid under pressure to the cylinder 265.

In the position of the valve 266 (Fig. 16) fluid under pressure from the pipe 68 enters the valve chamber 269 and passes through a pipe 273 into the cylinder chamber 274 to move the piston 264 together with the plunger 261 toward the right into an engagement with the notch 262 in the work driver 27. During this movement, fluid within a cylinder chamber 275 may exhaust through a pipe 276 into the valve chamber 270, through the central passage 271 into the valve chamber 268 and exhaust through a pipe 277 and a throttle valve 278 into the reservoir 67. The plunger 261 is maintained in engagement with notch 262 during the entire loading and unloading operation. The left hand end of the piston rod 262 is provided with an adjustable collar 258 (Fig. 16) which is arranged during movement toward the right to close the normally open limit switch LS2.

Figure 8:
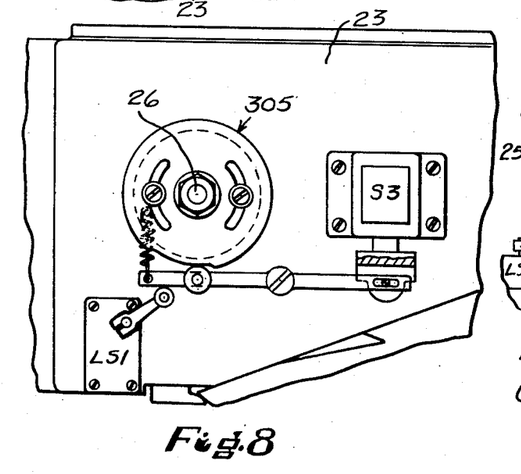
Figure 8 is a fragmentary left hand end elevation of the headstock as shown in Figure 2, showing a portion of the work stop control mechanism.

It is desirable to stop the rotary motion of the piston 32 after a grinding operation has been completed in a predetermined position so that the plunger 261 is opposite the V-shaped notch 262 in the work driver 27. A work stop control mechanism 305 has been diagrammatically illustrated in Fig. 16 and more fully illustrated in Fig. 8. This mechanism comprises a cam rotated by and in timed relation with the headstock spindle 26. This mechanism may be identical with that shown in the U. S. Reissue Patent No. 20,127 to H. A. Silven dated October 6, 1936, to which reference may be had for details of disclosures not contained herein. The work stop control mechanism 305 serves to energize the brake windings of the work drive motor 24 so as to stop the rotary motion of the head stock spindle 26 with the wrist pin hole 203 with the piston being ground in a horizontal position.

With the ground piston stopped in a loading position, an unloading plunger 280 is moved upwardly (Fig. 4), that is, in a horizontal direction in the normal arrangement of the machine into the engagement with the wrist pin hole 203 in the piston 32. The plunger 280 is fixedly mounted on a slide block 281 slidably supported on the left hand end of an unloading arm 282 (Fig. 4). A compression spring 283 serves normally to hold the slide member 281 in the position illustrated in Fig. 4.

The unloading arm 282 is mounted on the end of a piston rod 284 (Fig. 16). A piston 285 is fixedly mounted on the lower end of the piston rod 284 and is slidably mounted within a cylinder 286. A control valve 290 is provided for controlling the admission to and exhaust of fluid from the cylinder 286. The valve 290 is a piston type valve comprising a slidably mounted valve member 291 having a plurality of spaced valve pistons formed integrally therewith to form a plurality of spaced valve chambers 292, 293, and 294. The valve member 291 is provided with a central passage 295 which interconnects the valve chamber 292 with the valve chamber 294. A compression spring 296 serves normally to hold the valve member 291 in a left hand end position. A solenoid S5 is provided which when energized serves to shift the valve member 291 toward the right so as to reverse the flow of fluid to the cylinder 286.

In the position of the valve 290 (Fig. 16) fluid under pressure from the pipe 68 enters the valve chamber 293 and passes through a pipe 297 into a cylinder chamber 298 to move the piston 285 downwardly (Fig. 16). During this movement fluid within a cylinder chamber 299 may exhaust through a pipe 300 into the valve chamber 294, through the central passage 295 into the valve chamber 292 and exhaust through a pipe 301 into the reservoir 67. When it is desired to unload a ground piston 32, the solenoid S5 is energized in a manner to be hereinafter described to shift the valve member 291 toward the right so that fluid under pressure entering the valve chamber 293 will pass through the pipe 300 into the cylinder chamber 299 to move the piston 285 together with the plunger 280 upwardly (Fig. 16) into an engagement with the wrist pin hole 203 in the piston 32.

Figure 12:
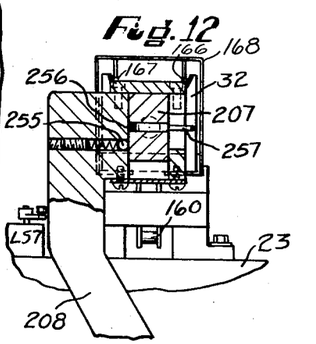
Figure 12 is a vertical sectional view taken approximately along the line 12—12 of Figure 7.

The footstock center 39 may then be withdrawn toward the right (Fig. 4) at which time released compression of the springs within the work driver 27 serves to shift the piston 32 together with the unloading plunger 280 and the slide block 281 toward the right (Fig. 4), against the compression of the spring 283, until a spring pressed ball 310 (Fig. 12) engages a hole 311 formed in the slide block 281. The slide block 281 remains in this position during the unloading clockwise movement of the arm 282. A guide rod 321 is fixedly supported by a lug 322 mounted on the rotatable cylinder 286. The guide rod 321 passes through a bushed hole 323 in the unloading arm 282. The rod 321 serves to facilitate swinging the unloading arm 282 when the vane motor 299 is actuated.

The cylinder 286 of the unloading mechanism is mounted for a rotary motion identical with that shown in Fig. 7 in connection with the work loading mechanism 234. A shaft 315 fixedly mounted on the cylinder 286 supports a vane 316 of a single vane-type motor 317. A shaft 315 is fixedly mounted to the lower end of the rotatable cylinder 286 (Fig. 16). The shaft 315 is connected to a single vane 316 of a vane-type fluid motor 317. The vane-type motor 317 is controlled by the control valve 241 so that both the unloading arm 282 and the loading arm 208 are simultaneously swung in a clockwise direction (Fig. 2) to deposit a ground piston 32 onto a bracket 320 and at the same time to convey a piston 32 to be ground from the plate 200 into axial alignment with the work driver 27 and the footstock center 39. The extent of the rotary motion of the cylinder 286 is controlled by a stud 350 (Fig. 4) carried by a collar 354 fixedly mounted on the cylinder 286, and a pair of adjustable dogs 351 and 352 mounted in a T-slot 353 formed in a collar 355 on the casing of the vane motor 317.

When the solenoid S7 is energized to shift the valve member 242 into a right hand end position fluid under pressure is passed through the pipe 237 into the motor chamber 238 to cause a rotary motion of the vane 236 in a clockwise direction to swing the loading arm 208 in a clockwise direction (Fig. 2). Simultaneously fluid under pressure in the pipe 237 enters a motor chamber 325 to start a rotary motion of the vane 316 in a clockwise direction (Fig. 16) to cause a simultaneous swinging movement of the unloading arm 282 to swing a ground piston from a position in axial alignment with the work driver 27 and the footstock center 316 onto an unloading bracket 320 (Fig. 2). During this swinging movement of the ground piston due to the center gravity of the piston which rotates about the spindle 280 so that the flat or closed end of the piston is positioned on the bracket 320 with the piston lugs 32a and 32b projecting upwardly. During this movement of the vane 316, fluid within a motor chamber 326 may exhaust through the pipe 240 into the valve chamber 243 and exhaust through the pipe 248 into the reservoir 267.

When solenoid S7 is deenergized, the valve 241 is shifted into the position illustrated in Fig. 16 so that the motor vanes 236 and 316 start movement in a counterclockwise direction to swing the loader arm 208 and the unloading arm 282 in a counterclockwise direction to be ready for the next cycle of operation. As the unloading arm 282 approaches a horizontal position as illustrated in Figs. 2 and 5 a plunger 312 engages the head 258 of the screw 259 and moves it in an upward direction to raise the spring pressed ball 310 out of the hole 311 thereby releasing the compression of the spring 283 to slide the slide block 281 and the plunger 280 into a left hand end position, as illustrated in Fig. 4.

The bracket 320 which receives the ground piston 32 is of sufficient length to support a plurality of ground pistons before they are discharged from the machine. This enables the operator to take a piston from the bracket 320 to gauge the same. As a freshly ground piston is swinging by the unloading arm 282 onto the bracket 320 it pushes the pistons along the bracket 320 toward the right so that the right hand piston 32 supported thereon slides down a chute 330 onto a conveyor belt 331 (Fig. 2). The left hand end of the conveyor belt 331 is supported and driven by a rotatable drum 332 (Fig. 3). The upper or right hand end of the conveyor belt 331 is supported by an idler drum 333.

A fluid motor 334 (Figs. 1, 2 and 3) is supported by a bracket 335 which is fixedly mounted relative to the base 10. The fluid motor 334 is operatively connected to drive a shaft 336 to impart a rotary motion to the drum 332 thereby conveying power to continuously move the conveyor belt 331. The motor 334 is operatively connected to the pressure pipe 68. An exhaust pipe 336 is provided to exhaust fluid from the motor 334 at a rate controlled by a throttle valve 337 (Fig. 16). By manipulation of the throttle valve 337, the speed of the conveyor belt 331 may be regulated as desired. This conveyor belt is preferably continuously driven at a slower rate of speed to carry ground pistons to a chute 338 (Fig. 3) which conveys ground pistons onto the discharge conveyor belt 115 where they are carried toward the right hand end of the assembly (Fig. 1) and deposited in a discharge chute 340 at the right hand end thereof.

Similar discharge conveyors 331A, 331B, 331C, 331D, 331E are provided for conveying successive ground pistons from the grinder units 20A, 20B, 20C, 20D, 20E onto the discharge conveyor belt 115. These conveyor belts and the associated parts are identical with that shown and described in connection with grinder unit 20 and therefore will not be described in detail.

Referring now to Fig. 16 which shows the electric and hydraulic diagram of actuating mechanisms and controls therefor the machine has been shown with the power off and in a stopped condition. This arrangement of mechanism and controls is duplicated in connection with each of the grinding units.

The electrical control apparatus with the power-off is illustrated as follows:

SWITCHES

Switch SW1 is open.

Switch SW2 is open, and main conveyor motor 125 is stopped.

Switch SW3 is open (is closed for automatic recycling).

Control lever 345 pivotally supported on the front of the machine base 21 is used for initiating a single grinding cycle.

Switch SW4 is open and hydraulic pump motor 65 is stopped.

Switch SW5 is a normally open cycle start switch.

Switch SW6 is a normally closed cycle stop switch.

Switch SW7 is a normally open-wheel motor start and stop switch.

SOLENOIDS

Solenoid S1 is deenergized and wheel slide 75 is in a rearward or inoperative position.

Solenoid S2 is deenergized and piston supporting trap door 150 is closed.

Solenoid S3 is deenergized and the normally closed contacts of limit switch of LS1 is closed.

Solenoid S4 is deenergized and the work positioning plunger 261 is in engagement with the V-shaped notch 262 in the work driver 27.

Solenoid S5 is deenergized and the unloading arm 282 is in a rearward position, that is, with the piston 285 in the position illustrated in Fig. 16.

Solenoid S6 is deenergized with the footstock center 39 in an operative position as illustrated in Fig. 4.

Solenoid S7 is deenergized with the loader arm 208 and the unloading arm 282 swung into the positions illustrated in Fig. 2.

Solenoid S8 is deenergized with the loader arm 208 in an out position, that is, with the piston 211 in the position illustrated in Fig. 16.

Solenoid S9 is deenergized with the chain index piston 171 in a reset position as indicated in Fig. 16.

LIMIT SWITCHES

Limit Switch LS1 normally closed. Energizes brake windings in motor 24 to stop the work drive motor 24 in a predetermined loading position.

Limit Switch LS2 is normally open, momentarily closed to energize the relay switch CR3 and S5.

Limit Switch LS3 is normally open, when closed relay switch CR4 and solenoid S6 are energized.

Limit Switch LS4 is normally open, when closed S7 is energized.

Limit Switch LS5. The normally closed contacts are closed, and the normally open contacts are open. Serves as a holding circuit.

Limit Switch LS6. The normally closed contacts are held open which deenergizes the solenoid S8.

Limit Switch LS7. The normally closed contacts are held closed which energizes S8 and the time relay TD3 (held closed by the counter clockwise movement of the loader arm 208.

TIME DELAY RELAYS

TD1 is a time delay relay, whose contacts are held from closing until after a predetermined time interval upon energization to close a circuit and start the work drive motor 24.

TD2 is a time delay relay which delays the opening of contacts on deenergization to open a circuit.

TD3 is a time delay relay which delays the opening of one set of contacts and the closing of another set of contacts of deenergization which starts the machine cycle for a repeat cycle, also energizes the solenoid S9 to index the loader chain 160 to position a piston 32 to be ground on the spindle 202 of the loading arm 208 and deenergizes the solenoid S7.

Operation

The operation of the automated piston grinding machine will be readily apparent from the foregoing disclosure. To start the machine, the switch SW1 is closed thereby energizing the solenoid S8 to move the piston 211 upwardly (Fig. 16) to move the loader arm 208 and the spindle 202 into a loading position. The closing of switch SW1 also energizes the time relay TD3 through the now held closed limit switch LS7. At the same time the solenoid S2 is energized it swings the trap door 150 so as to allow a piston 32 to drop in a manner previously described onto the loading conveyor chain 160, ready to be indexed toward the loading arm 208. The closing of the switch SW1 also starts the hydraulic pump drive motor 65 which serves to pass fluid under pressure to move the loading arm 206 into the loading position as above described. The hydraulic motor 334 on each of the grinding units 20, 20A, 20B, 20C, 20D, and 20E is started to start the unloading conveyor 331 at each of the units which conveys ground pistons 32 from the bracket 320 on the machine to the discharge conveyor belt 115. The speed of the unloading conveyor belt 331 is controlled by the throttle valve 337. The closing of the switch SW2 serves to start the motor 125 thereby starting the main loading conveyor belts 100, 101 and the discharge conveyor belt 115 so as to convey pistons to be ground to each of the loading conveyors.

A plurality of pistons to be ground are placed on the main conveyor belts 100 and 101 and the pistons thereon are conveyed in a manner previously described into the space between the deflector plate 141 and the guide plate 142 at each of the grinding stations. When starting up the grinding units, in order to fill the loading conveyor chains 160 and to position a piston 32 to be ground on the spindle 202 of the loading arm 208, a switch SW4 is closed and opened intermittently until the loading chain 160 is filled with pistons to be ground and a piston to be ground is located on the spindle 202 on the arm 208. The closing of the normally open contacts of the switch SW4 energizes the solenoid S9, through the now closed timed relay TD3 to start an indexing movement of the piston 171 to index the loading chain 160. The opening of the normally closed contacts of the switch SW4 deenergizes the solenoid S2 thereby releasing the tension of the spring to close the trap door 150 so that the next piston 32 to be ground may slide thereon. Another set of normally closed contacts of the switch SW4 opened to prevent the timer T1 from energizing the solenoid S9 at this time. The now closed switch SW3 serves to automatically recycle the machine so that it operates continuously.

A control lever 345 is swung in a counter clockwise direction (Fig. 16) to close a normally open start switch SW5 to energize the timer T1. The normally closed stop switch SW6 sets up a holding circuit through the timer T1 controlled contacts RC1 which are now closed. The contacts CC1 open to deenergize the solenoid S2 and the contact CC2 closes so as to energize the solenoids S1, S3, S9 and the time relays TD1 and TD2. The solenoid S3 holds a roller 341 out of the recess of a cam 342 and the arm opens the limit switch LS1 to prevent braking of the work driver motor 24. The energizing of the solenoid S1 starts the forward movement of the wheel slide 75 to feed the grinding wheel 77 toward the work to grind the same to the desired and predetermined extent. The energizing of the solenoid S9 indexes the loading chain 160 to advance a piston 32 to be ground onto the spindle 202 of the loading arm 208. The time delay relay TD3 contacts close energizing the solenoid S4 which moves the work positioning plunger 261 out of engagement with the V-shaped notch 262 in the work driver 27. The time relay TD1 contacts close after a time delay to start the work drive motor 24 (no pistons between centers, unless placed between centers before the machine is started).

The grinding cycle continues until the timer T1 times out. It times out the contacts CC1 closed and contacts RC1 and CC2 open. The opening of contacts RC1 breaks a holding circuit. The opening of contacts CC2 deenergizes the solenoids S3, S1, S9, and the time delay relay TD1 and TD2. The deenergizing of solenoid S3 releases the tension of the spring 343 to move the roller 341 into an engagement with the rotating recessed cam 342. When the roller 341 drops into the recessed, the limit switch LS1 closes thereby energizing the brake windings of the work drive motor 24 through now delayed opening of contacts of timed delay relay TD2. The time delay relay TD1 contacts open immediately at time-out, so brake can be applied.

The solenoid S1 is deenergized to cause a rearward movement of the wheel slide 75 to an inoperative position. The deenergizing of the solenoid S9 serves to reset the loading chain index piston 171 which moves through an idle stroke. The over-running clutches above described hold the loader chain 160 against slippage in the reverse direction during the resetting movement. Then the time delay relay TD2 times out, the contacts open, deenergizing the solenoid S4 and the motor brake is released allowing the positioning plunger 261 to move into operative engagement with the V-shaped notch 262 in the work driver 27.

During movement of the plunger 261 into an operative positioning, the collar 258 momentarily closes the limit switch LS2 thereby energizing the relay switch CR3 to close the normally open contacts thereof. One set of contacts of the relay switch CR3 serve as a holding circuit through the limit switch LS5. The other set of contacts serve to close the circuit thereby energizing the solenoid S5 to move the piston 285 upwardly (Fig. 16) to move the unloading arm 282 so that the spindle 280 moves into an engagement with the wrist pin hole 203 of the piston 32 which has just been ground. As the unloading arm 282 approaches this postion it closes a limit switch LS3 thereby energizing the relay switch CR4 and the solenoid S6. The normally open contacts of relay switch CR4 close to set up a holding circuit through the normally closed contacts of the limit switch LS5. The energizing of the solenoid S6 serves to move the footstock center 39 toward the right so as to unclamp the ground piston. The release compression of the springs within the work driver 27 positioned the ground pistons toward the right so as to shift the slide block 281 until the spring pressed ball 310 moves into engagement with the hole 311 thereby shortening the effective length of the unloading arm 282. During movement of the footstock center 39 toward the right, the normally closed contacts of the limit switch LS6 closed to serve as a holding circuit at this time (solenoid S8 and relay TD3 have been energized through the limit switch LS7) and it also holds the time relay TD3 after the limit switch LS7 opens so that when the footstock movement toward the right closes the normally open contacts limit switch LS4, the solenoid S7 will be energized to pass fluid under pressure to the vane motors 234 and 317 simultaneously to impart a rotary motion to the loading arm 208 and the unloading arm 282 in a clockwise direction so as to simultaneously position a ground piston on the bracket 320 and to position a piston 32 to be ground in axial alignment with the work driver 27 and the footstock center 39. As the loading arm 208 moves in a clockwise direction, the limit switch LS7 opens, but limit switch LS6 holds the solenoid S8 and the time relay TD3 energized. When the loading arm 208 has completed its clockwise swinging movement to position a piston to be ground, it opens the normally closed contacts and closes normally open contacts of the limit switch LS5. The closing of the normally open contacts of the limit switch LS5 holds the solenoid S7 energized through the time relay TD3. The opening of the normally closed contacts of the limit switch LS5 deenergizes the relay switches CR4 and CR3 the relay switch CR4 deenergizes the solenoid S6 thereby causing the piston 41 to move toward the left to move the footstock center 39 into an engagement with the open end of the piston 32 to be ground. As the footstock center 39 moves the piston 32 to be ground into an engagement with the work driver 27, the slide block 207 is moved toward the left until the spring pressed ball 255 engages the hole 256 thereby shortening the effective length of the loading arm 208. The deenergizing of the relay switch CR3 energizes the solenoid S5 thereby moving the piston 285 downwardly (Fig. 16) to pull the spindle 280 downwardly out of engagement with the wrist pin hole 203 of the ground piston 32 (the piston 32 is held on the plate 320 by vertically arranged sides during the withdrawal of the spindle 280).

As the footstock center 39 moves toward the left the limit switch LS4 opens (limit switch LS5 now holding solenoid S7 energized). When the footstock center 39 clamps the piston 32 to be ground in operative position, the limit switch LS6 is opened and held open during the grinding operation to deenergize the solenoid S8. The deenergizing of the solenoid S8 serves to move the piston 211 downwardly (Fig. 16) to withdraw the spindle 202 of the loading arm 208 from an engagement with the wrist pin hole 203 of the piston to be ground. During the withdrawal of the spindle 202, the plunger 257 engages the head 258 of the screw 259 which moves the plunger upwardly to disengage the spring pressed ball 255 from the hole 256 thereby releasing the compression of the spring 209 so that the slide block 207 moves into the position illustrated in Fig. 7 thereby increasing the effective length loading arm 208.

The opening of the limit switch LS6 also deenergizes the time delay relay TD3 and after a predetermined time interval the normally open contacts of the time delay relay TD3 open to deenergize the solenoid S7 which serves to simultaneously pass fluid under pressure to the vane motors 234 and 317 simultaneously to swing the loader arm 208 and the unloading arm 282 in a counter clockwise direction so that they are ready for the next cycle of operation. The normally closed contacts of the time delay relay TD3 closed to again start the timer T1 and thereby start a new cycle of operation. The normally open contacts of time delay relay TD3 prevent the solenoid S7 from being energized until the loader arm 208 and the unloading arm 282 reach their initial positions as illustrated in Fig. 2. As the loader arm reaches this position the limit switch LS7 is closed thereby energizing the solenoid S8 and the time delay relay TD3 to move the piston 211 upwardly (Fig. 16) so that the spindle 202 is ready to receive the next piston 32 when the loading chain 160 is indexed. The normally open contacts of the time delay relay TD3 is closed, through the now energized contacts CC2 of the timer T1 to energize the solenoid S9 thereby imparting an indexing movement to the loader chain 160 to move the wrist pin hole 203 of the next piston 32 onto the spindle 202 of the loading arm 208.

I claim:

1. A piston grinding apparatus comprising a plurality of spaced pistons grinding units, and a loading and unloading apparatus therefore including a longitudinally extending loading conveyor arranged parallel to such units, a transversely arranged loading unit between said conveyor and each of said grinding units, a deflector adjacent to each loading unit to deflect pistons to be ground from the loading conveyor onto each of said loading units, a loading arm on each of said grinding units arranged to transfer successive pistons to be ground from each of the loading units onto said grinding units, and an independent indexing mechanism independently to index each of said loading units to position successive pistons on said loading arms.

2. A piston grinding mechanism, as claimed in claim 1, in combination with the parts and features therein specified of a longitudinally extending unloading conveyor arranged parallel to said grinding units, a transversely arranged unloading unit between each of said grinding units and said unloading conveyor, and a pivotally mounted unloading arm on each grinding unit which is arranged to pick-up a ground piston from each unit and to transfer it onto said unloading unit.

3. A piston grinding machine, as claimed in claim 1 in combination with the parts and features therein specified of a work supporting arbor on each of said loading arms which is arranged so that on each indexing movement of the loading unit the wrist pin hole of a piston to be ground moves onto said arbor, a transversely movable pivotal support for said loading arm including a piston and cylinder, means including a control valve to control the admission to and exhaust of fluid from said cylinder, said valve serving to cause a transverse movement of said arm to move said arbor axially into an operative position relative to said loading unit, a rotary motor operatively connected to impart a rotary motion to said piston and cylinder to swing said loading arm to transfer a piston to be ground from the loading unit into each of the grinding units.

4. A piston grinding machine, as claimed in claim 1, in combination with the parts and features therein specified in which each of the grinding units is provided with a rotatable work driver and a footstock center to support the opposite ends of a piston to be ground, means to stop said work driver in a predetermined loading position, and a work supporting arbor on said loading arm to position a piston to be ground in a predetermined position relative to the work driver.

5. A piston grinding machine, as claimed in claim 1, in combination with the parts and features therein specified of a work driver and a footstock center on each of the grinding units to support the opposite ends of a piston to be ground, means including a work stop control mechanism to stop the work driver in a predetermined loading position, and means including a plunger to hold said work driver in a loading position during a loading and unloading operation.

6. A piston grinding machine, as claimed in claim 1, in combination with the parts and features therein specified in which each of the grinding units is provided with a rotatable work driver and a footstock center to support opposite ends of a piston to be ground, means including a work stop control mechanism to stop the work driver in a predetermined loading position, an index notch in said work driver, and a hydraulically actuated plunger to hold said driver in a predetermined position during a loading and unloading operation.

7. A piston grinding apparatus having a plurality of spaced pistons grinding units arranged back-to-back, and a loading and unloading apparatus therefor including a pair of adjacent longitudinally extending loading conveyors between said units, means to drive said conveyors in opposite directions, a deflector plate adjacent to each end of said conveyors to transfer pistons to be ground from one conveyor to the other, a transversely arranged loading unit between said conveyors and each of said grinding units, a deflector adjacent to each loading unit to deflect pistons to be ground from the loading conveyor onto each of the loading units, a loading arm on each of the grinding units arranged to transfer successive pistons to be ground from the loading unit into said grinding unit, and independent indexing mechanism intermittently to index each of said loading units to position successive pistons on said loading arms.

8. A piston grinding machine, as claimed in claim 7, in combination with the parts and features therein specified of a longitudinally extending discharge conveyor between said grinding units, a transversely arranged unloading unit between each of said grinding units and said discharge conveyor to transfer ground pistons onto the discharge conveyor, and a pivotally mounted unloading arm on each of said grinding units which are arranged to pick-up a ground piston from the grinding units and to transfer it onto the unloading unit.

9. A piston grinding machine, as claimed in claim 7, in combination with the parts and features therein specified of a pivotally mounted unloading arm having a piston supporting arbor on each of said grinding units, means including a piston and cylinder to form a transversely movable pivotally support for said unloading arm, means including a control valve to control the admission to and exhaust of fluid from said cylinder, said valve serving to cause a transverse movement of said unloading arm after a grinding operation to move said arbor axially into the wrist pin hole of a ground piston, a rotary fluid motor operatively connected to impart a rotary motion to said piston and cylinder to swing said unloading arm to transfer a ground piston from the grinding unit onto said unloading unit.

10. A piston grinding machine, as claimed in claim 7, in combination with the parts and features therein specified of a guiding trough to convey pistons to be ground from the loading conveyor to the loading unit, a normally closed pivotally mounted trap door at the end of said trough, said door being located above the end of the said loading unit, an electric solenoid intermittently to open said door to facilitate dropping successive pistons onto said loading unit, a guide to orient said pistons as they drop onto said unit, and guiding means precisely to orient said pistons to be ground during successive indexing movements of the loading unit so as to position a piston to be ground in a predetermined position on said loading arm.

11. A piston grinding machine, as claimed in claim 7, in combination with the parts and features therein specified in which the loading arm is provided with a piston supporting arbor, means including a piston and cylinder operatively connected to move said loading arm transversely to and from an operative position, and means including a rotary fluid motor operatively connected to impart a rotary motion to the piston and cylinder so as to swing the loading arm to transfer successive pistons to be ground from the loading unit into the grinding unit.

12. A piston grinding machine, as claimed in claim 7, in combination with the parts and features therein specified of an arbor on said loading arm arranged to engage the wrist pin hole of a piston to be ground to support the piston on said arm during a loading operation, a piston and cylinder to support said loading arm, a control valve to control the admission to and exhaust of fluid from said cylinder so as to move said arm transversely to and from an operative position, said cylinder being mounted for a rotary motion, and means including a rotary fluid motor operatively connected to impart a rotary motion to said cylinder and piston to facilitate swinging said loading arm so as to transfer a piston to be ground from the loading unit into an operative position in said grinding unit, said piston and cylinder serving to move said arm to an inoperative position to facilitate withdrawing the arbor from the wrist pin hole of the piston to be ground when the piston is supported in an operative position in the grinding unit.

13. A piston grinding machine, as claimed in claim 7, in combination with the parts and features therein specified of a guiding trough to convey said pistons to be ground which are deflected from the loading conveyor to the loading unit, a pivotally mounted trap door at the end of said trough, said door being located above the end of the loading unit, yieldable means normally to maintain said door closed, an electric solenoid intermittently to open said door to facilitate dropping successive pistons onto said loading unit, a guide plate between said trough and said loading unit arranged to orient said pistons as they drop from the trough onto said loading unit, and guiding means on said loading unit precisely to orient said pistons to be ground during successive indexing movement of the loading unit so as to position a piston to be ground in a predetermined position on said loading arm.

14. In a piston grinding machine having a pair of adjacent longitudinally arranged loading conveyors, means to drive said conveyors in opposite directions, a discharge conveyor arranged directly over the loading conveyors, a plurality of spaced grinding units arranged on opposite sides of said loading conveyors, a transversely movable loading unit between said loading conveyors and each of said grinding units, and a deflector adjacent to each of said loading units to deflect successive pistons to be ground from the loading conveyors onto each of said loading units, said deflector being arranged so that excessive pistons to be ground pass by the deflector to succeeding loading units.

15. In a piston grinding apparatus, as claimed in claim 14, in combination with the parts and features therein specified of a deflector adjacent to each end of said loading conveyors to transfer pistons to be ground from one conveyor to the other so as to maintain a continuous circulation of unground pistons on said loading conveyors.

References Cited in the file of this patent

UNITED STATES PATENTS

| | | |
|---|---|---|
| 1,840,841 | Highberg | Jan. 12, 1932 |
| 1,926,959 | Quimby | Sept. 12, 1933 |
| 2,694,960 | Kahle | Nov. 23, 1954 |

FOREIGN PATENTS

| | | |
|---|---|---|
| 628,713 | Great Britain | Sept. 2, 1949 |
| 913,514 | Germany | July 26, 1954 |